Dec. 20, 1949     J. F. MUSTEE     2,492,104

WATER HEATER

Filed Oct. 8, 1945

INVENTOR.

Joseph F. Mustee

BY Stoodling and Krost
attys.

Patented Dec. 20, 1949

2,492,104

UNITED STATES PATENT OFFICE 2,492,104

WATER HEATER

Joseph F. Mustee, Cleveland, Ohio

Application October 8, 1945, Serial No. 621,145

3 Claims. (Cl. 122—19)

My invention relates to improvements in water heaters and in particular to water heaters having a heating element next adjacent the storage tank with the heat produced by the heating element radiated and directed about the tank.

An object of my invention is the provision of certain new and useful improvements in water heaters of the type in which heat is applied directly to the water storage tank.

Another object of my invention is the provision of a shell eccentrically spaced about the storage tank for enclosing both the tank and the heating element to provide more efficient heating of the tank.

Another object of my invention is the provision of a shell for substantially enclosing a water tank and the heating element therefor, in which the shell has a somewhat conical shape for providing space between the shell and the tank for the heating element.

Another object of my invention is the provision of an improved neat appearing water heater which may be economically and practically manufactured from standard parts.

A further object of my invention is the combination of a shell and baffle plates for more efficiently directing heat about the tank.

Other objects and a fuller understanding of my invention may be had by referring to the following description and claims, taken in conjunction with the accompanying drawing, in which:

Figure 1:
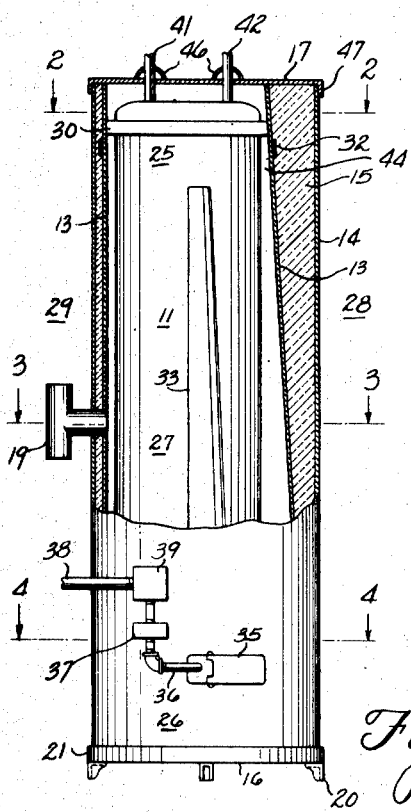
Figure 1 is a front elevational view of my water heater with certain parts shown in cross section and with other parts omitted for clarity.
Figure 2:
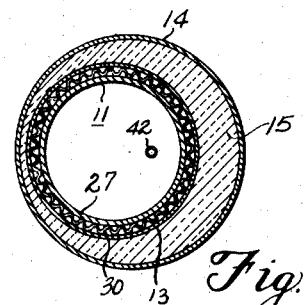
Figure 2 is a transverse sectional view taken along the line 2—2 of Figure 1 with certain parts removed for clarity.
Figure 3:
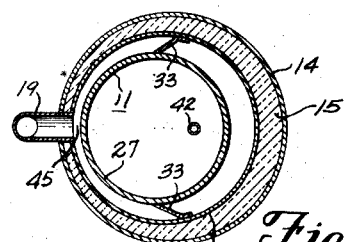
Figure 3 is a transverse sectional view taken along the line 3—3 of Figure 1 with certain parts removed for clarity.
Figure 4:
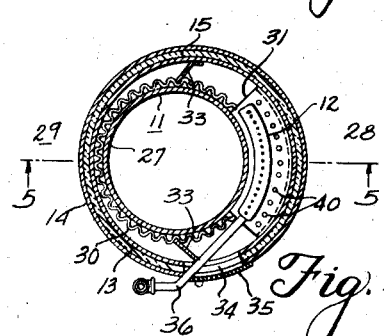
Figure 4 is a transverse sectional view taken along the line 4—4 of Figure 1 with certain parts removed for clarity.
Figure 5:
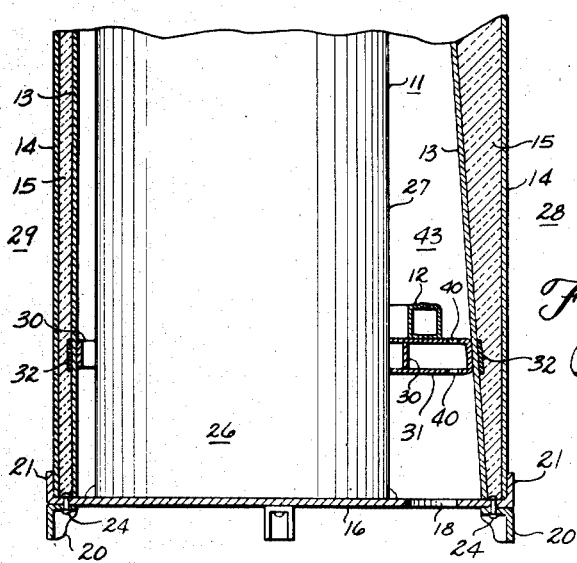
Figure 5 is an enlarged and fragmentary view taken along the line 5—5 of Figure 4, with certain parts removed for clarity.

In the preferred embodiment of my invention, as illustrated in my drawings, my water heater includes a water storage tank 11, a heating element 12 and an inner shell 13 which extends about, and substantially encloses the heating element 12 and the storage tank 11. The heating element 12, in my drawings, is located on the right side 28 of my water heater. An outer shell 14 may be used to house the component parts of my water heater to provide a neat appearing article of manufacture. The storage tank and the shells are supported by a bottom support member 16. A top cover plate 17 having a rim 47 thereabout encloses the top end of my water heater. An insulation material 15 may be inserted between the inner shell 13 and the outer shell 14.

The bottom support member 16 has a flange or rim 21 thereabout and an opening 18 therein. The support member 16 and the storage tank 11 may be fastened by welding or other suitable means. When the water heater is assembled, the opening 18 in the bottom support member 16 is aligned with the heating element 12 to provide air intake means therefor. The support member 16 has legs 20 fastened thereto by rivets 24 or other suitable fastening means. These legs 20 extend downwardly from the support member to hold the water heater above the floor and prevent blocking of the opening 18 to permit passage of air therethrough. It is understood, however, that this air intake opening 18 may be in another part of the water heater, providing it permits air to enter into the region of the heating element for combustion.

The water storage tank 11, as illustrated and used in my description, may be a standard cylindrical hot-water tank. For purposes of clarity in my description and claims, I have designated the water storage tank 11 as having a top end portion 25 and a bottom end portion 26 connected by wall 27. Water inlet and outlet tubes 41 and 42, as illustrated in Figure 1, extend outwardly through the cover plate 17 for connecting the storage tank 11 to a water line. Washers 46 may be pressed about the inlet and outlet tubes 41 and 42 and against the top cover plate 17 to hold the top cover plate relatively stationary with respect to the water storage tank 11. These washers are pressed onto the tubes after the cover has been placed over the storage tank 11.

The inner shell 13, as used in the preferred embodiment of my invention, somewhat resembles a frustrum of a circular cone other than a right circular cone. The top end part of the somewhat cone-shaped inner shell is substantially concentric with the top end portion 25 of the tank. The bottom end part of the inner shell is substantially eccentric with the bottom end portion 26 of the tank. The longitudinal axis of the inner shell is at an angle to the longitudinal axis of the cylindrical water storage tank 11. A transverse sectional view taken parallel to the ends of the inner cone-like shell shows the inner shell substantially circular. However, it is understood that in actual assembly of the water heater, the inner shell may slightly deviate from the circular cross section illustrated in my drawings. Although inner shells of other type cross sections may be used, I have found that it is most practical to use one of substantially circular cross section. The bottom end of the inner shell 13, being eccentrically spaced about the lower portion of the tank, provides an enlarged combustion chamber 43 on the right side 28 of the water heater and in the region of the heating element 12. The inner shell also provides a circulating chamber 44 extending about the top end portion 25 of the tank. An exit tube 19 extends through the outer shell and the inner shell to the circulating chamber 44. The exit tube is disposed substantially intermediate the ends of the water heater and on the left side 29 of the water heater. The left side 29 of the water heater is that side diametrically opposite the heating element 12. The exhaust chamber 45 is that part of the circulating chamber 44 which extends into the region of the exit tube 19. By placing this exit tube 19 substantially intermediate the ends of the water tank, I have reduced the cooling convection air currents about the tank. In reducing the effect of the convection currents about the tank, the temperature of the storage tank 11 and its contents remain more nearly constant over a longer period of time.

As is illustrated in my drawings, the insulation 15 between the inner or somewhat conical shaped shell 13 and the outer or cylindrical shell 14, is thicker about the top end portion 25 of the storage tank 11 than it is about the bottom end portion 26. Warm water in a storage tank generally rises to the top of the tank, while the cold water goes to the bottom of the tank. By using a cone-like inner shell, I am able to make the insulation thicker about that portion of the storage tank where it is most needed without substantially increasing the over-all size of my water heater.

A corrugated spacer band 30 extends about the storage tank and holds the inner shell from contacting the wall of the tank. The spacer band 30 encircles the top end portion 25 of the tank and permits circulation about the top end portion 25 of the tank and within the inner shell 13. I have employed a clamp band 32 which is tightened about the inner shell and in the region of the corrugated spacer band 30 to hold the shell onto the tank 11 and relatively stationary therewith. Although other suitable means may be employed for spacing the inner shell from the wall of the tank, I have found a clamp band to be the most practical.

As is illustrated in the drawings of my preferred embodiment, the bottom part of the inner shell is eccentrically spaced from the bottom end portion 26 of the storage tank 11. The inner shell may be held relatively stationary with the bottom end portion of the tank by a corrugated spacer band 30, a heating element support member 31, and a clamp band 32 which is tightened about the inner shell. The support member 31 which has a substantially U-shaped cross section, fits over the corrugated spacer band 30. This support member 31, which supports the heating element, has air holes 40 permitting air to enter the combustion chamber after it enters the opening 18 in the bottom support 16. The support member 31 extends at least partially about the tank and is held in place by the tightening of the clamp band 32 for supporting the heating element 12. The corrugated spacer band 30 spaces the shell from the storage tank on the left side 29 thereof. The heating element support member 31 spaces the shell from the tank on the right side 28 thereof. The bottom part of the shell is further from the tank on the right side 28 than on the left side, thus providing room therebetween for the heating element 12 and the combustion chamber 43.

In my drawings, I have illustrated the use of a curved gas burner heating element 12 which extends partially about the water tank. This heating element is supported by the support member 31 in the combustion chamber 43. Although I have used the curve heating element, it is understood that other suitable heating elements may be used without departing from the scope of the invention.

Baffle plates 33 located on the sides of the heating elements extend longitudinally of the tank from the bottom end thereof upwardly to the region of the circulating chamber 44. These baffles 33 may be spot welded to the inner shell to support them between the tank 11 and the inner shell 13. The purpose of the baffles 33 is to direct the heat from the heating element upwardly and about the top end portion 25 of the tank 11. In directing the heat about the top end portion 25 of the tank 11 before it escapes through the exhaust tube, I have been able to obtain a higher efficiency from my water heater.

A temperature regulator 37 may be connected in the fuel supply line 38 for regulating the gas burning heating element 12. An opening 34 extending through the shells permits a tube 36 to connect the heating element 12 to the regulator 37. A thermostat temperature control 39, having a thermo-responsive part extending into the water storage tank 11, controls the temperature of water in the storage tank 11. The regulator 37 is a safety control device to prevent gas from entering the gas burning heating element 12 when there is no combustion taking place. A door 35 of any standard type may be suitably fastened substantially on the front side of my water heater for installing and lighting the gas burner heating element 12. This door 35 may have air openings therein for permitting air to enter the combustion chamber.

In assembly, my water heater may be constructed by first welding the bottom support 16 to the bottom end of the tank 11. The corrugated spacer bands 30 may then be placed about the tank and the burner heater support 31 slipped over the bottom spacer band. The cone-like inner shell 13, which has the baffle plates 33 welded thereto, may then be clamped about the storage tank by the clamp bands 32. The outer shell may then be slid about the inner shell and within the rim 21 of the support 16. The top cover plate 17 may then be placed over the inlet and outlet tubes 41 and 42 to finish enclosing the tank. The washers 46, which are pressed over the tubes 41 and 42, tighten the top cover plate 17 with respect to the water storage tank 11, and the rim portion 47 about the top cover plate holds the outer shell relatively stationary therewith.

In the operation of my preferred water heater, air enters the combustion chamber to support combustion. The baffle plates and the inner shell circulate and direct the heat upwardly along the right side of my water heater. The heat is then circulated over the top of the baffle plates, then about the top end portion of the tank. After the heat has circulated about the top end portion of the tank, it moves downwardly on the left side thereof to the exit tube. In examining Figure 1, it is noted that the baffle plates and cone-like inner shell cause the heat and products of combustion to pass over the baffle plates and about the top end portion of the tank before they enter the exhaust chamber. By circulating the heat about the water storage tank, I have been able to increase the effective heating surface on the storage tank of my water heater. This increasing of the effective heating surface makes it possible for me to transfer a greater amount of heat from the heating element to the storage tank. By transferring a greater amount of heat to the storage tank, I have been able to increase the efficiency of my water heater.

In summarizing the operation, air enters the combustion chamber, the products of combustion circulate about the tank to heat the storage tank and its contents, and then the cooled products of combustion exit through the exhaust chamber and the exit tube.

Although I have described my invention in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:

1. In a water heater, an elongated water storage tank having a top end portion and a bottom end portion, a heating element extending partially about the bottom end portion for producing heat, shell means substantially enclosing the heating element and the tank and being spaced from the tank, said shell means having a somewhat conical shape, said shell means being concentric with the top end portion of the tank and being eccentric with the bottom end portion of the tank, baffle means associated with the heating element and extending longitudinally of the storage tank and from the bottom end portion upwardly to a spaced distance from the top end portion of the tank, said baffle means and said shell means directing the heat in an upward direction on one side of the elongated water storage tank and in a downward direction on the other side thereof.

2. In a water heater, a water storage tank having a top end portion and a bottom end portion, a heating element extending partially about the bottom end portion for producing heat, shell means substantially enclosing the heating element and the tank and being spaced from the tank, said shell means having a somewhat conical shape, said shell means being concentric with the top end portion of the tank and being eccentric with the bottom end portion of the tank, said shell means providing a combustion chamber in the region of the heating element and a circulating chamber about the top end portion of the tank, said shell means providing an exhaust chamber substantially intermediate the ends of the tank and on the side diametrically opposite the combustion chamber, baffle means associated with the heating element and extending from the bottom of the tank upwardly to the circulating chamber, said baffle means and said shell means directing the heat about the upper end portion before it enters the exhaust chamber.

3. In a water heater having an upper and a lower end, an elongated water container, a somewhat conical shaped shell enclosing said container and being spaced therefrom, directing plate means disposed between said container and said shell, said directing plate means extending upwardly from the lower end of the heater and terminating at a distance from the upper end thereof, said directing plate means defining at least a first and a second elongated surface portion on said elongated water container with the surface portions extending longitudinally thereof, a heating element at the lower end of said water heater between the somewhat conical shaped wall of the said shell and the said container and in the region of the first elongated surface portion, said shell means being concentric with the water container at the upper end and being eccentric with the water container at the lower end, said shell thereby being spaced furthest from the elongated water container in the region of said heating element, an exhaust extending through said shell and disposed substantially intermediate the ends of said water heater and in the region of the second elongated surface portion, said directing plate means and said shell directing the heat in an upward direction along and against said first elongated surface portion of the water container from the lower end of said water heater to the upper end of the water heater, said directing plate means directing the heat in a downward direction along said second elongated surface portion of the water container from the upper end of the water heater to the exhaust.

JOSEPH F. MUSTEE.

REFERENCES CITED

The following references are of record in the file of this patent:

UNITED STATES PATENTS

| Number | Name | Date |
| --- | --- | --- |
| 719,277 | Trenner | Jan. 27, 1903 |
| 1,291,714 | Austin | Jan. 21, 1919 |
| 1,333,614 | Gauger | Mar. 16, 1920 |
| 1,382,495 | Fowles | June 21, 1921 |
| 1,691,008 | Griswold | Nov. 6, 1928 |